United States Patent [19]

Harris et al.

[11] Patent Number: 5,475,836
[45] Date of Patent: Dec. 12, 1995

[54] INTERFACE FOR PROVIDING ACCESS TO EXTERNAL DATA SOURCES/SINKS

[75] Inventors: Peter O. Harris, Arlington; David P. Reed, Wellesley; Carl J. Young, Acton, all of Mass.

[73] Assignee: Lotus Development Corporation, Cambridge, Mass.

[21] Appl. No.: 170,458

[22] Filed: Dec. 20, 1993

Related U.S. Application Data

[63] Continuation of Ser. No. 539,011, Jun. 15, 1990, abandoned, which is a continuation-in-part of Ser. No. 427,939, Oct. 25, 1989, abandoned, which is a continuation of Ser. No. 33,556, Apr. 1, 1987, abandoned.

[51] Int. Cl.[6] .............................. G06F 17/30; G06F 13/00
[52] U.S. Cl. .................... 395/600; 395/500; 364/DIG. 1; 364/282.1; 364/283.3; 364/284
[58] Field of Search .................................. 395/600, 500, 395/650, 700

[56] References Cited

U.S. PATENT DOCUMENTS

| | | | |
|---|---|---|---|
| 4,315,310 | 2/1982 | Bayliss et al. | 395/275 |
| 4,418,382 | 11/1983 | Larson et al. | 395/200 |
| 4,476,528 | 10/1984 | Matsumoto et al. | 395/425 |
| 4,564,903 | 1/1986 | Guyette et al. | 395/425 |
| 4,604,686 | 8/1986 | Reiter et al. | 395/500 |
| 4,683,549 | 7/1987 | Takaki | 395/775 |
| 4,714,995 | 12/1987 | Materna et al. | 395/600 |
| 4,742,447 | 5/1988 | Duvall et al. | 395/375 |
| 4,750,114 | 6/1988 | Hirtle | 395/250 |
| 4,751,635 | 6/1988 | Kret | 395/600 |
| 4,769,772 | 9/1988 | Dwyer | 395/600 |
| 4,774,655 | 9/1988 | Kollin et al. | 395/600 |
| 4,792,896 | 12/1988 | Maclean et al. | 395/500 |
| 4,805,134 | 2/1989 | Calo et al. | 395/600 |
| 4,825,354 | 4/1989 | Agrawal et al. | 395/600 |
| 4,975,829 | 12/1990 | Clarey et al. | 395/700 |
| 4,989,141 | 1/1991 | Lyons et al. | 364/408 |
| 5,058,000 | 10/1991 | Cox et al. | 395/600 |
| 5,109,515 | 4/1992 | Laggis et al. | 395/725 |
| 5,129,086 | 7/1992 | Coyle, Jr. et al. | 395/650 |
| 5,165,022 | 11/1992 | Erhard et al. | 395/275 |
| 5,175,854 | 12/1992 | Chung et al. | 395/650 |

OTHER PUBLICATIONS

Cardenas, Alfonso F., "Heterogeneous Distributed Database Management: The HD–DBMS," Proceedings of the IEEE, vol. 75, No. 5, May 1987, pp. 588–600.

Primary Examiner—Paul V. Kulik
Attorney, Agent, or Firm—Fish & Richardson

[57] ABSTRACT

An interface for enabling an application program to connect to a selected one or more of a plurality of external data sources/sinks, the application program running on a computer having active memory, the interface including a plurality of driver means, each of said drivers corresponding to a different subgroup of the plurality of external data sources/sinks; a name manager for identifying the drivers to the application; a selector for selecting one of the identified external data sources/sinks; a loader for loading the drivers corresponding to the selected external data source/sink into active memory; and an identifier for identifying a first plurality of entry points to a first plurality of function calls that said application can make to the loaded drivers, the plurality of function calls including function calls for establishing and/or terminating connectivity to the loaded drivers.

20 Claims, 25 Drawing Sheets

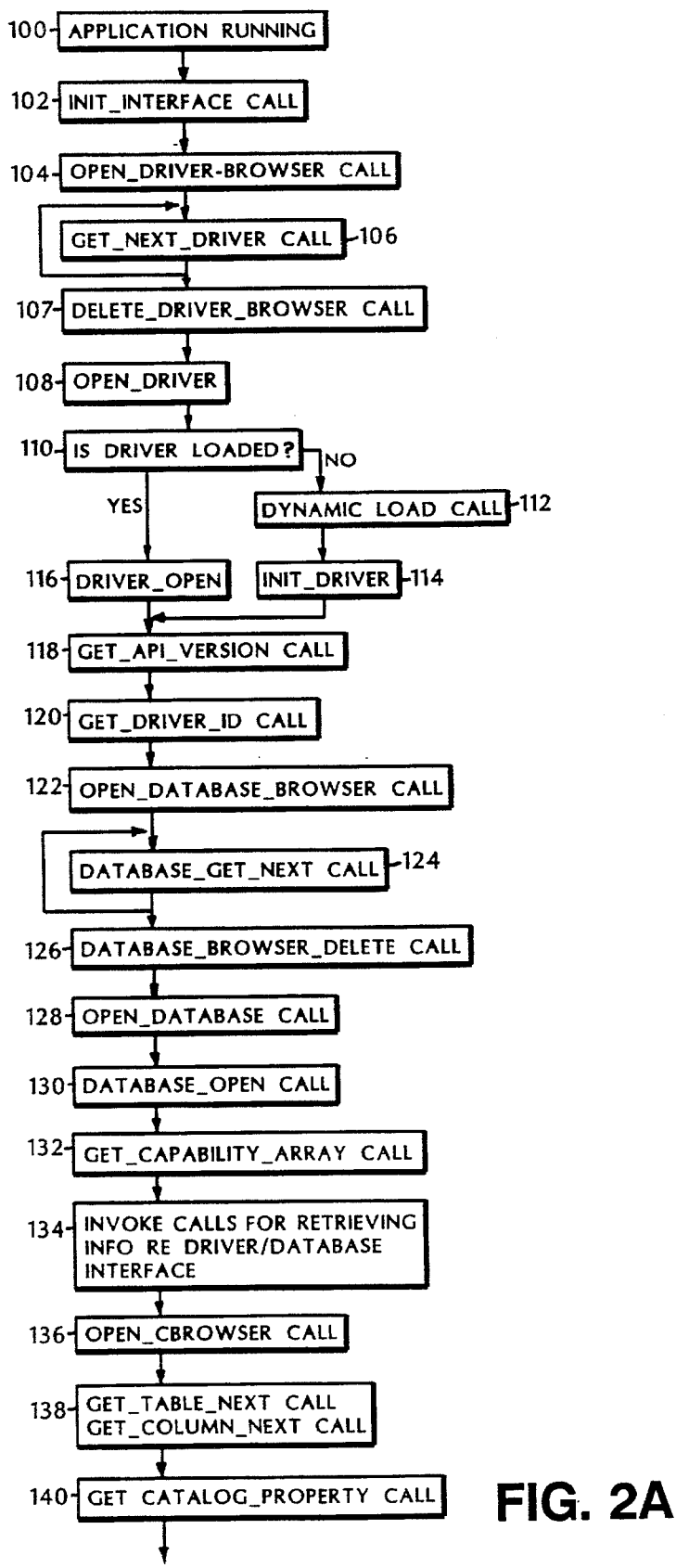
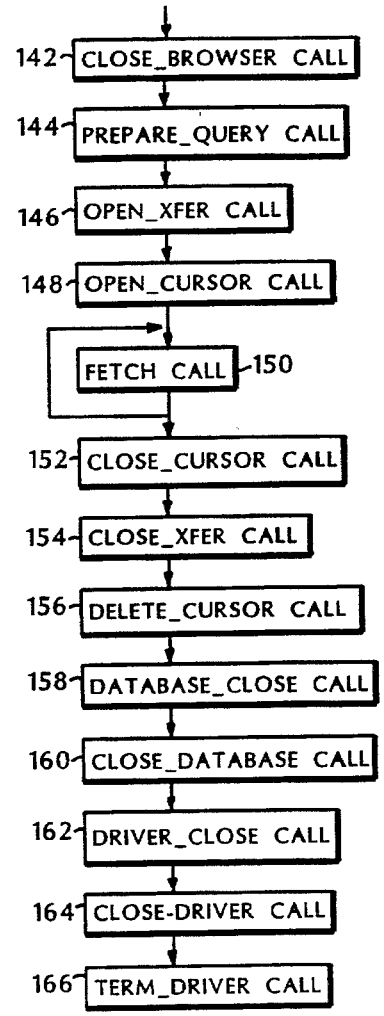
FIG. 2A
FIG. 2B

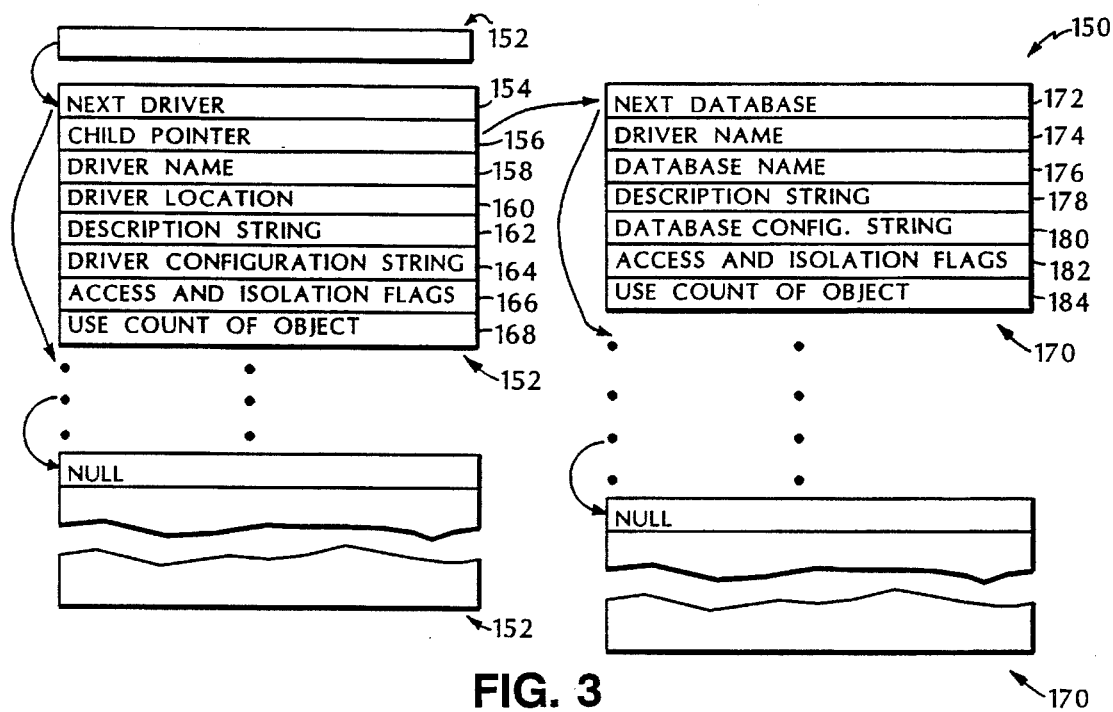

FIG. 3

| 202 | SIZE OF ENVIRONMENT DESCRIPTOR BLOCK |
| --- | --- |
| 204 | PLATFORM IDENTIFIER |
| 206 | CHARACTER SET IDENTIFIER |
| 208 | PAD FOR ALIGNMENT |
| 210 | MAXIMUM NUMBER OF MAPPED HANDLES |
| 212 | TYPE OF MEMORY ALLOCATION SCHEME |
| 214 | LARGEST MEMORY BLOCK THAT CAN BE ALLOCATED |
| 216 | NULL HANDLE VALUE |
| 218 | APPLICATION IDENTIFICATION STRING |
| 220 | MEMORY ALLOCATOR |
| 222 | MEMORY DEALLOCATOR |
| 224 | MEMORY MAPPER |
| 226 | MEMORY UNMAPPER |
| 228 | FIXED MEMORY ALLOCATOR |
| 230 | FIXED MEMORY DEALLOCATOR |
| 232 | MODULE LOADER |
| 234 | MODULE DELOADER |
| 236 | SYSTEM COMMAND SHELL |
| 238 | PRIVATE INTERFACE DATA |
| 240 | POINTER TO REGISTRATION FILE |

FIG. 4 open_cbrowser*
    creates a browser handle for the catalog of the specified database.

get_table_next*
    positions the browser handle at a table in the catalog.

get_column_next*
    positions the browser handle at a column in the current table.

get_catalog_property*
    returns the specific property for the table or column at which the browser handle is positioned.

close_cbrowser*
    closes a catalog browser.

alter_column
    adds a new column to a table, alters the definition of an exisiting column, renames a column, or drops a column from a table.

alter_table
    renames an existing table.

comment_table
    adds, deletes, or modifies a comment on a table or a view.

label_table
    adds, deletes, or modifies a label on table or a view.

comment_column
    adds, deletes, or modifies a comment on a column.

label_column
    adds, deletes, or modifies a label on a column.

create_index
    adds an index to an existing table.

create_table
    creates a new table in a specified database.

create_view
    creates a new view based on a query specification.

create_synonym
    creates a synonym for a table review.

drop_index
    removes an index from the base.

FIG. 8A drop_table
    removes a table from a specified database.

drop_view
    removes a view from the database.

drop_synonym
    removes a synonym from the database.

grant_table_privileges
    defines the data definition and manipulation privileges granted to a list of users with respect to a list of tables or a list of columns in a single table.

grant_database_privileges
    allows a list of users to have connection, resource creation, or database administrator authority.

revoke_table_privileges
    revokes the data definition and manipulation privileges that a list of users has with respect to a list of tables or list of columns in a single table.

revoke_database_privileges
    disallows a list of users to have connection, resource creation, or database administrator authority.

get_capability_array*
    obtains the capability array from the driver.

get_data_types*
    obtains a handle to an array of data types supported by the database.

get_type-name*
    obtains the name of a data type that the driver supports.

get_default_xfer_type*
    obtains the default standard data type that the driver uses to transfer data for a column with a specified standard or extended datatype.

set_characterset*
    informs the driver which character set it should use for strings in the database.

prepare_query*
    compiles a query specification.

prepare_statement
    compiles a command specified as a string.

FIG. 8B declare_cursor
  obtains a cursor for a query that was previously compiled by prepare_query or prepare_statement and then saved.

open_xfer*
  allocates a data transfer buffer that the driver uses to transfer column data values to the application.

alter_xfer*
  allows the application to change the transfer data types proposed for a given array or xferdefs created by the driver and open_xfer.

open_cursor*
  executes the query implied by the specified cursor, modifying it, if necessary, by the specified parameter values.

fetch*
  positions the cursor to a specified row in the result set and fills the xferdef array with the contents of that row.

close_cursor*
  terminates the current query for a specified cursor. The cursor handle remains valid and may be reopened by open_cursor.

close_xfer*
  terminates operations on the specified xferblock.

delete_cursor*
  deletes the specified cursor.

start_lread
  starts reading a column that contains a long text or long bytes value. This function is called after fetch has positioned a cursor on a row that contains a long data value to be read.

get_long_length
  gets the number of bytes of data in a long text or long bytes column for the current row.

set_long_position
  positions a long text or long column so that the next call to read or update starts at the specified byte.

read_long
  fetches a block of data from a long text or long bytes column.

FIG. 8C stop_lread
    stops reading data from a long text or long bytes column. This function must be called before the next call to fetch.

start_lwrite
    starts writing a long text or long bytes column.

write_long
    writes a block of data into a long text or long bytes column in the row that is added to a table by the next call to execute_statement for this statement.

stop_lwrite
    terminates a write operation for a long text or long bytes column.

delete_position
    compiles a command to delete the row at the current position of the specified cursor.

delete_search
    compiles a query that deletes all records selected by a specified parameter.

update_position
    compiles a command to update the row with a current position of a specified cursor.

update_search
    compiles a query that updates all the records selected by the specified where clause with the values of the specified expressions.

inset_query
    specifies a query whose results are inserted into a specified table.

insert_values
    compiles a command that inserts a row of values into a specified table.

open_table
    opens a table or a view for a batch of operations. This function provides the capability to optimize a situation which multiple updates, insertions and deletions are performed on a single table.

close_table
    closes a table or view that has been opened by open_table after a batch of operations is complete.

commit
    terminates the current transaction. It makes all changes to the database permanent and visible to concurrent users.

FIG. 8D rollback
> terminates the current transaction, abandoning all pending changes. The database must appear to concurrent users to be the same as it was prior to the start of the concurrent transaction.

set_isolation_level
> establishes the degree to which the calling application can isolate itself from the effects of changes made to the specified database by other applications that are executing concurrently. Isolation levels provide management of concurrent updates for more than one user. The application can set the isolation level at the database_open call. This function allows the application to change the isolation level, as long as the database remains open.

get_statement
> retrieves a statement that was previously saved by name or number, and assigns a statement handle for subsequent use by execute_statement or declare_cursor.

get_cursorname
> returns a text string from the back end data source that identifies the current positioned record previously set by declare_cursor.

execute_statement
> executes a statement prepared by prepare_statement, delete_position, delete_search, update_position, update_search, insert_query, or insert_values.

delete_statement :
> deletes a compiled statement and/or a save statement.

break_query
> terminates the current driver operation. This is an asynchronous call that causes the driver and database engine to stop whatever command is in process for the calling application.

execute_string\*
> executes a command in the native language of the driver or database engine. The driver executes the command.

last_string\*
> returns the last dialect string generated by the driver.

get_status\*
> obtains status information about the last operation, as defined by the driver. A driver need only store status information about the last completed operation. The driver may clear status information when it starts a new operation.

FIG. 8E

SUMMARY CAPABILITY MASK

| |
|---|
| data definition |
| grant and revoke privileges |
| fetch with orientation |
| delete, update, insert rows |
| long data types |
| more than project |
| fetch rowid columns |
| at least one wherenode type |
| at least one logic operation |
| at least one arithmetic operation |
| at least one scalar operation |
| at least one math operation |
| at least one string operation |
| at least one date function |
| at least one financial function |
| embedded subqueries |
| at least one aggregation |
| at least one set operation |
| prepared statement handles |
| concurrency control |
| at least one catalog table |

DATA DEFINITION CAPABILITY MASK  /1104

| |
|---|
| create tables |
| rename a table |
| drop table |
| add a column to a table |
| drop a column from a table |
| rename an existing column |
| alter column's NULL constraint |
| increase column's length |
| create ascending index |
| create descending index |
| create multicolumn index |
| both asc & desc in same index |
| unique index |
| index on expressions |
| drop index |
| create views |
| create views with check ption |
| drop views |
| creat private synonym |
| create public synonym |
| drop synonym |
| add comment to column |
| add comment to table |
| add label to column |
| add label to table |

FIG. 9C

PRIVILEGES CAPABILITY MASK  1106

| |
|---|
| grant SELECT privilege |
| grant INSERT privilege |
| grant DELETE privilege |
| grant UPDATE privilege |
| grant INDEX privlilege |
| grant ALTER privilege |
| grant privileges to PUBLIC |
| grant with GRANT option |
| grant column privileges |
| grant DBA authority |
| grant RESOURCE authority |
| grant CONNECT authority |
| revoke table privileges |
| revoke DBA privileges |

FETCH ORIENTATION CAPABILITY MASK  1108

| |
|---|
| fetch without moving cursor |
| fetch backward |
| fetch first row |
| fetch last row |
| fetch relative row |
| fetch absolute row |
| fetch without wait |

FIG. 9D

DATA UPDATE CAPABILITY MASK — 1110

| delete current row |
| --- |
| do delete searched |
| update current row |
| do update searched |
| insert row of values |
| insert result of query |
| open table |
| close table |
| insert expressions |
| returns record count in status |

LONG DATA CAPABILITY MASK — 1112

| read long data |
| --- |
| write long data |
| get length of long data |
| seek position in long item |
| >1 long column at a time |
| update long data |

FIG. 9E

QUERY CAPABILITY MASK  ~1114

| recognizes break query call |
| --- |
| >1 table in query tree |
| where tree supported |
| group by supported |
| having clause supported |
| order by clause supported |
| for update clause supported |
| table name aliases |
| expressions in output |
| group by number supported |
| order by number supported |

ROWID CAPABILITY MASK  ~1116

| can fetch value of row id |
| --- |
| can fetch row id from view |
| rowid changes on update |

WHERE CAPABILITY MASK  ~1118

| OPERATOR nodes |
| --- |
| COLUMN nodes |
| DATA nodes |
| PARAMETER nodes |
| QUERY nodes |
| NULL nodes |

FIG. 9F

LOGIC OPERATORS CAPABILITY MASK ⌐1120

| |
|---|
| logical conjunction |
| logical disjunction |
| logical not |
| relational equality |
| relational inequality |
| relational less than |
| relational greater than |
| relational less than or equal |
| relational greater than or equal |
| relational inclusion |
| set membership in list |
| wild card compare |
| escape character for LIKE |
| compare to NULL |

ARITHMETIC OPERATORS CAPABILITY MASK ⌐1122

| |
|---|
| arithmetic add |
| arithmetic substract |
| arithmetic multiply |
| arithmetic divide |
| arithmetic unary plus |
| arithmetic unary minus |
| arithmetic exponentation |

FIG. 9G

MISCELLANEOUS OPERATORS CAPABILITY MASK 1124

| |
|---|
| string concatenation |
| the current userid |
| binary selection |
| list selection |
| set constructor |
| extended function |

MATH FUNCTION OPERATORS CAPABILITY MASK 1126

| |
|---|
| arc cosine |
| arc sine |
| 2-quadrant arc tangent |
| 4-quadrant arc tangent |
| cosine |
| e to a power |
| integer part |
| natural logarithm |
| base ten logarithm |
| modulus |
| value of pi |
| rounded value |
| sine |
| square root |
| tangent |
| absolute value |

FIG. 9H

STRING FUNCTION OPERATORS CAPABILITY MASK ⌒1128

| find substring |
|---|
| leading substring |
| embedded substring |
| trailing substring |
| length of string |
| convert to lower case |
| convert to upper case |
| upper case first letters |
| remove excess white spaces |
| repeat string n times |
| replace substring |
| exact match |
| string converted to number |
| number converted to string |
| character converted to number |
| number converted to character |

FIG. 91

DATA FUNCTION OPERATORS CAPABILITY MASK ~1130

| |
|---|
| create date from yyyy/mm/dd |
| day of month |
| month of year |
| year number |
| current datetime stamp |
| datetime stamp for today |
| create time from hh:mm:ss |
| hour of day |
| minute of hour |
| second of minute |
| current time timestamp |
| day of week of date |
| quarter of year of date |
| date of Monday of this week |
| date of 1st of this month |
| date of 1st of this quarter |
| date of 1st of this year |
| string to date conversion |
| string to time conversion |
| add duration to date |
| get time zone |

FIG. 9J

FINANCIAL OPERATORS CAPABILITY MASK ⟋1132

| |
|---|
| compounding periods for investment |
| future value |
| periodic payments to payoff loan |
| present value of payments |
| periodic interest rate |
| straight-line depreciation |
| sum-of-years-digits depreciation |
| # payments periods of investment |
| double-declining depreciation |

SUBQUERY OPERATORS CAPABILITY MASK ⟋1134

| |
|---|
| recognizes IN_SEARCH_OP |
| recognizes EXISTS_OP |
| recognizes ALL_OP |
| recognizes ANY_OP |

FIG. 9K

AGGREGATION FUNCTION OPERATORS CAPABILITY MASK ~1136

| |
|---|
| minimum value |
| maximum value |
| count of non-null values |
| count of rows |
| mean value |
| sum of values |
| population standard deviation |
| sample standard deviation |
| population variance |
| sample variance |
| distinct value filter |
| count distinct columns |
| count all columns non-nulls |

SET FUNCTION OPERATORS CAPABILITY MASK ~1138

| |
|---|
| set intersection |
| set union |
| set difference |
| full outer join |
| left outer join |
| right outer join |
| cascading outer join |

FIG. 9L

PREPARED STATEMENTS CAPABILITY MASK — 1140

| |
|---|
| can create statement handles |
| named statements in database |
| numbered statements in database |
| multiple cursors per statement |
| compile commands in native dialect |

TRANSACTION AND CONCURRENCY CONTROL CAPABILITY MASK — 1142

| |
|---|
| transaction abort |
| transaction commit |
| set isolation at any time |
| cursor stability |
| read repeatability |
| read only access |
| single user access |
| break out of transaction |
| lock table command |
| break out of statement |
| hold cursor position across commit |

FIG. 9M

STANDARD SYSTEM CATALOG CAPABILITY MASK 1144

| |
|---|
| can query system tables |
| column authorization |
| column definition |
| index definition |
| key column |
| synonym definition |
| synonym to base table |
| table authorization |
| table definition |
| user authorization |
| view definition |
| extended column definition |
| join definition |
| cataloged joins |
| joining columns |

FIG. 9N

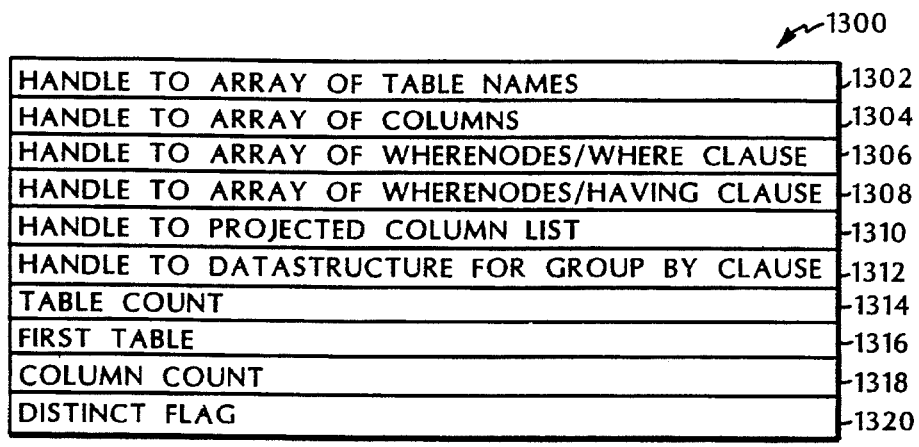
FIG. 10
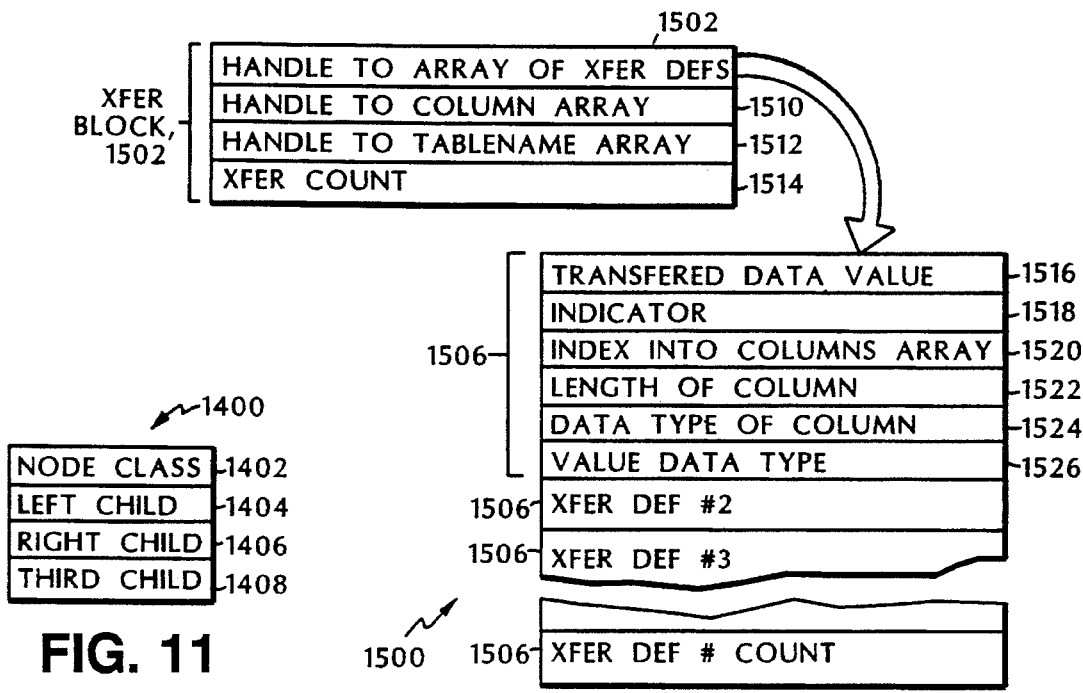
FIG. 11
FIG. 12
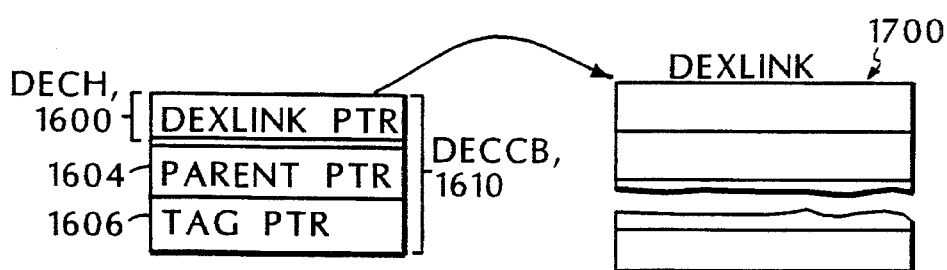
FIG. 13

INTERFACE FOR PROVIDING ACCESS TO EXTERNAL DATA SOURCES/SINKS

BACKGROUND OF THE INVENTION

This is a continuation of application Ser. No. 07/539,011, filed Jun. 15, 1990, now abandoned, which is a continuation-in-part of application Ser. No. 07/427,939, filed Oct. 25, 1989, now abandoned and incorporated herein by reference. Application Ser. No. 07/427,939 is, in turn, a continuation of application Ser. No. 07/033,556, filed Apr. 1, 1987, now abandoned.

The invention relates to an interface for enabling a computer application program to communicate with a data source/sink, such as a database engine.

Spreadsheet programs provide a powerful mechanism for analyzing large amounts of complex data such as is typically found, for example, in financial reports, stock quotations, business income and expense statements, sales and product inventories, etc. Sometimes a significant portion of the data that is processed by a spreadsheet program is available through computerized data sources, such as, for example, a database program. It is desirable, therefore, to have a mechanism which enables the spreadsheet program to directly access such data. A problem, however, is that there is a large number of commercially available databases and no standard according to which they all operate. Some databases, being more sophisticated than others, have far greater capabilities associated with them. Other databases possess only rudimentary capabilities for organizing data. In addition, there is no common language that is understood by all databases. Some databases use SQL (also know as SEQUEL for the Structured English QUEry Language that was designed and implemented by International Business Machines), some databases use QBE (Query By Example) and other databases use yet other languages. Any interface to a database must take into account that database's unique capabilities and requirements. Such differences among databases (and the even greater differences among all possible data sources) create significant barriers to developing a common interface useable with a wide variety of databases.

SUMMARY OF THE INVENTION

In general, in one aspect, the invention is an interface for enabling an application program to connect to a selected one or more of a plurality of external data sources/sinks, said application program running on a computer having active memory. The interface includes a plurality of driver means, each of which corresponds to a different subgroup of the external data sources/sinks; a name manager for identifying the drivers to the application; means for selecting one of the, identified-external data sources/sinks; means for loading the driver means corresponding to the selected external data source/sink into active memory; and means for identifying a first plurality of entry points for a first plurality of function calls that the application can make to the loaded driver means, the plurality of function calls including function calls for establishing and/or terminating connectivity to the loaded driver means.

Preferred embodiments include the following features. The first plurality of function calls includes: browsing function calls for identifying the external data sources/sinks to the application, and function calls for establishing and/or terminating connectivity to a selected one of the external data sources/sinks associated with said loaded driver means. The interface also includes means for identifying a second plurality of entry points for a second plurality of function calls that said application can make to said loaded driver means, said second plurality of function calls relating to accessing data in said selected external data source/sink. The second plurality of function calls includes catalog browsing function calls for identifying tables of data that are available through the external data source/sink and for identifying columns within the tables. There is also a function call for returning a capability array for the data source/sink which identifies the capabilities of other function calls of the second plurality of function calls. The capability array includes a plurality of masks, each of the masks associated with a different logical group of capabilities. One of the masks is a summary mask including an entry corresponding to each of the other masks, each entry indicating whether any of the capabilities of the corresponding logical group of capabilities is present.

Also in preferred embodiments, the name manager includes means for establishing a registration data structure that identifies the plurality of drivers and the plurality of external data sources/sinks available to the application program. Also, the interface includes browsing means for searching through the registration data structure so as to identify to the application program the available drivers.

In general, in another aspect, the invention is an interface for enabling an application program to connect to a selected external data source/sink. The interface includes means for establishing connectivity to the selected external data source/sink; and means for identifying to the application an array of capabilities associated with the external data source/sink, the identified capabilities being available to the application.

In preferred embodiments, the interface also includes means for identifying a plurality of function calls that said application can make to the selected external data source/sink, where the plurality of function calls includes the means for returning the capability array for the data source/sink. The capability array includes a plurality of masks, each of which is associated with a different logical group of capabilities. Among the plurality of masks is a summary mask which includes an entry corresponding to each of the other masks, each entry indicating whether any of the capabilities of the corresponding logical group of capabilities is present. The capability array also includes masks which correspond to the following capability groups: data definition capabilities, privileges capabilities, data update capabilities, fetch orientation capabilties, long data capabilities, query capabilities, row identification capabilities, where capabilities, logical operators, arithmetic operators, mathematical function operators, string function operators, data function operators, financial operators, subquery operators capabilities, aggregation function operators, set function operators, prepared statement capabilities, transaction and concurrency control capabilities, and standard system catalog capabilities.

In general, in yet another aspect, the invention is an interface for enabling an application program to connect to an external data source/sink, where the application program supports a first plurality of data types and the external data source/sink supports a second plurality of data types. The interface includes means for establishing connectivity to the data source/sink; and means for negotiating a mutually supported data type for transferring data between the application and the external data source/sink.

Preferred embodiments include the following features. The negotiating means includes means for identifying to the application which of the second of plurality of data types the external data source/sink proposes to use to transfer data to the application; and means for changing from the proposed data type to the mutually supported data type. The negotiating means also includes means for identifying the data types included among the second plurality of data types and the changing means includes means for selecting one of the second plurality of data types as the mutually supported data type.

One advantage of the invention is that applications may be independent of the specific systems that control the data that the application requires. The invention provides a standard interface powerful enough to accommodate demanding application requirements, while allowing drivers to have substantial flexibility in supporting the interface.

Another advantage of an embodiment of the invention is that it implements the semantics of relational operations through an Application Program Interface (API) that is implemented as a set of procedure calls and data structures. By using the API, the applications are not confined to a particular SQL dialect. In addition, drivers that do not support SQL directly do not need an SQL parser. Operations are determined by direct processing of the data structures passed by the procedure calls of the API. The applications are provided transparent access to a diverse group of one or more external databases so that the application can transfer data independently of the source of that data. That is, the invention provides an API that allows the applications to communicate with selected sources of data regardless of the type or location of the data source. The power of the API reflects in part the functional capabilities of the source of data and thus may vary from one data source to the next. In addition, it is a runtime binding system that loads and establishes connectivity to selected sources of data at runtime.

Other advantages and features will become apparent from the following description of the preferred embodiment and from the claims.

BRIEF DESCRIPTION OF THE DRAWINGS

FIGS. 2A and 2B depict a flow chart of a typical sequence of function calls for the system shown in FIG. 1;

FIG. 3 illustrates the structure of a registration data structure;

FIG. 4 illustrates an environment descriptor block;

FIGS. 8A through 8E illustrate the function calls that are accessible through DBLINK;

FIGS. 9A through 9N illustrate a capability groups array and associated capability masks;

FIG. 10 illustrates a querytree data structure;

FIG. 11 illustrates a wherenode data structure;

FIG. 12 illustrates a transfer block data structure; and

FIG. 13 illustrates data structures associated with the extension features of the system.

DESCRIPTION OF THE PREFERRED EMBODIMENT

Figure 1:
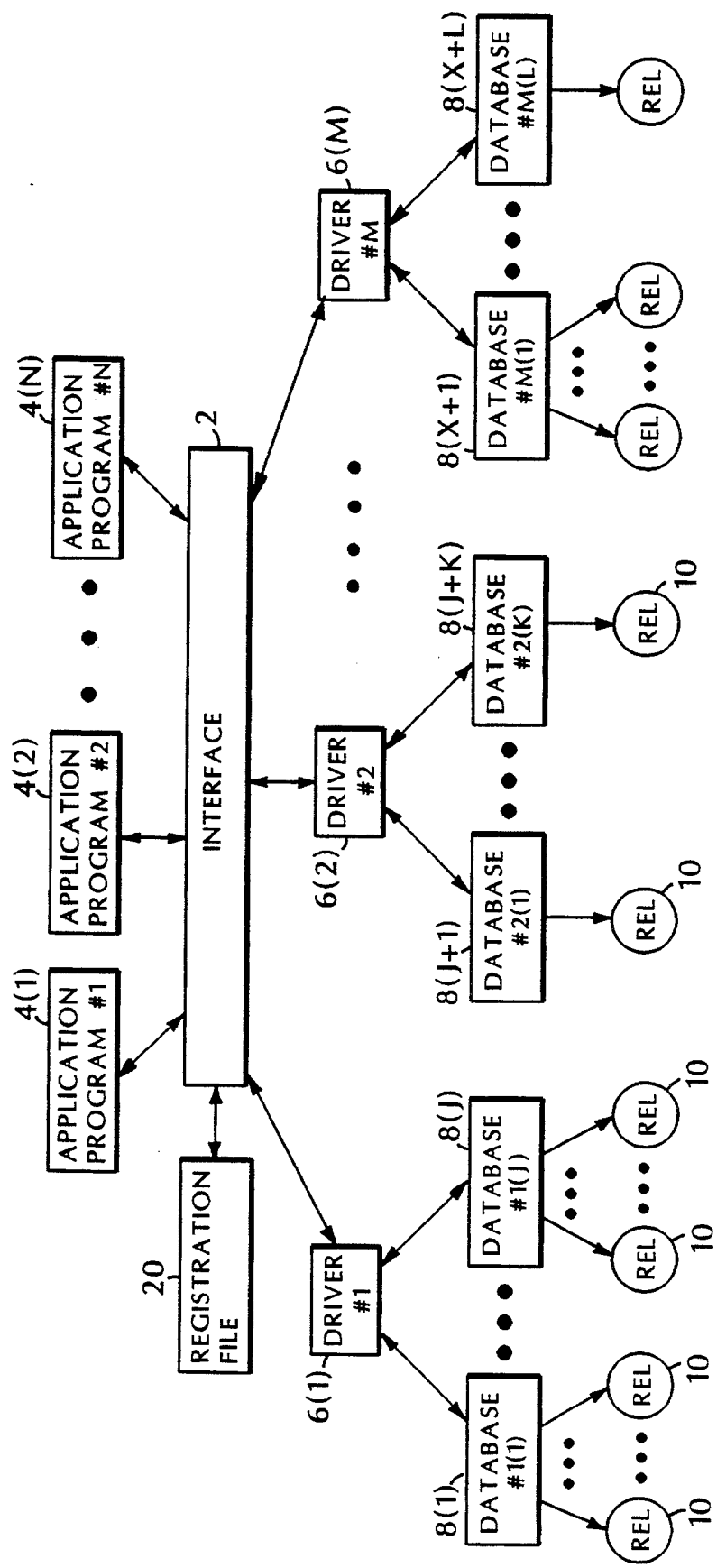
FIG. 1 illustrates a block diagram of a system which embodies the invention.

Referring to FIG. 1, a system which embodies the invention includes an interface 2 which may be invoked by one or more application programs 4(1) through 4(N) (generally identified by reference numeral 4). The application programs 4 (which shall be referred to as applications 4) may be, for example, spreadsheet programs, word processing programs or other programs which use or generate data.

An application 4 uses interface 2 to establish connectivity to one or more drivers 6(1) through 6(M) (generally identified by reference numeral 6). Associated with each driver 6 is a set of one or more external databases 8(1) through 8(X+L) (generally identified by reference numeral 8). After establishing connectivity to one of drivers 6, application 4 can, with the assistance of that driver, establish connectivity to one or more of the external databases 8 available to that driver. Typically, each external database 8 manages one or more relations 10 containing stored data. Once application 4 establishes connectivity to a particular one of external databases 8, it can, with the assistance of that database, access selected relations 10 and create other relations.

The capabilities of databases 8 may vary considerably, some only possessing rudimentary functionality While others possess complex powerful functionality. As will be described in greater detail below, applications 4 can discover through drivers 6 the capabilities of the associated databases 8 and through mechanisms provided by drivers 6 can access those capabilities to manipulate data. Thus, to the extent reflected by the capabilities supported by the driver/database connection, an application 4 can transfer certain data manipulation tasks to the driver/database interface thereby relieving itself of having to perform those tasks.

Before describing in detail the underlying data structures and functions which implement interface 2 and drivers 6, a general overview of the operation of the system will first be given.

Upon invoking interface 2, an application 4 gains access to a collection of driver browsing functions which give it the ability to discover the list of available drivers 6 and their attributes. When a driver 6 is identified to which connectivity is desired, application 4 allocates memory for a driver link (DVLINK) data structure (to be described) and invokes a routine to establish connectivity to that driver. If driver 6 has not yet been loaded into active memory, interface 2 first dynamically loads driver 6 into memory. Once it is loaded, driver 6 stores certain driver-specific information in DVLINK. Some of the stored information identifies multiple entry points into driver 6. Each entry point represents a different call that is supported by driver 6 and that may be made to driver 6 by application 4. The complete collection of available calls represents the service and management capabilities of the driver interface to the external databases 8.

Among the functions accessible through the entry points into driver 6 is a collection of database browsing functions which application 4 can use to discover the list of available databases 8. These browsing functions are similar to those available for the driver. Once application 4 identifies a particular one of databases 8 to which connectivity is desired, it allocates another portion of memory for a database link (DBLINK) data structure (to be described) and application 4 invokes one of the routines identified by an entry point in the DVLINK to establish that connectivity. To establish connectivity, driver 6 fills in the DBLINK with database-specific information, including entry points to a group of calls that may be made by application 4 to, among other things, explore the list of relations 10 available to database 8, manipulate those relations 10, and exercise other functionality that is available through database 8.

One of the function calls available through the DBLINK reports to application 4 the capabilities that are supported by that particular driver/database interface. The capabilities include, for example, whether that driver/database combination can perform a delete search or insert a row of values in a specified table of a relation, or grant access privileges, etc. The capabilities are reported as an array of bits, each bit position corresponding to a different capability. Set bits indicate capabilities that are supported and cleared bits indicate capabilities that are not supported.

Another set of functions that is accessible through the DBLINK permit application 4 to browse through and access relations 10 that are available to the database. These functions are collectively referred to as the catalog browser functions and they give driver 6 the ability to supply application 4 with enough information about tables and columns in relations 10 for application 4 to construct and execute data management commands for that database.

As a vehicle for providing details about the data structures and functions which support the system, a typical sequence of function calls (refer to FIGS. 2A and 2B) for establishing connectivity to a relation available to a particular database will be described. As each function call is described, the relevant data structures will be introduced and also described in detail, referring to other figures where appropriate. The following description, however, will repeatedly return to FIGS. 2A and 2B as each new step in the sequence is introduced.

Both the driver and the application allocate data structures. The following description specifies which structures the driver allocates and which structures the application allocates. When the driver allocates structures, it requests the required memory from the application.

It is assumed that the user begins with an application 4 running on a computer and that no applications have yet attempted to access the functionality of interface 2. That is, no drivers 6 have been loaded into active memory (step 100).

Given this initial condition, application 4 begins by calling an init_interface function which initializes the environment for interface 2 and constructs a registration data structure 150 (see FIG. 3) that will be used for browsing through the available drivers 6 and registered databases 8 (step 102). The init_interface function also identifies an application allocated buffer for returning an error message in the event that the init_interface function fails.

As part of the environment intialization, the init-interface function passes to interface 2 a pointer to a environment descriptor block (ENVBLK 200, see FIG. 4) that is allocated and supplied by application 4. The application uses ENVBLK 200 to store a description of the environment, i.e., to store certain application-specific information required by interface 2 and to identify a small number of call backs that the system can make to the application. More specifically, as shown in FIG. 4, fields 202 through 240 of ENVBLK 200 contain the following information.

Field 202 contains the size of the ENVBLK in total number of bytes stored. Field 204 contains an identifier of the platform on which the application is running such as for example whether the platform is a PC using a DOS or an OS/2 operating system or a workstation or a mainframe operating system. Field 206 contains an identifier of the character set utilized by the application. Field 208 contains a pad that is used to maintain alignment of the data structure. Field 210 contains the maximum number of handles that can be mapped at any one time by the application. Field 212 identifies the type of memory manager that is provided by the application. Field 214 contains the size, in bytes, of the largest contiguous block of memory that can be allocated. Field 216 contains the platform-specific null handle value. Field 218 contains a pointer to a string that identifies the application to the driver.

Fields 220 through 236 identify the calls that can be made back into the application. They relate primarily to mapped memory deallocator functions, respectively. Fields memory management functions. Fields 220 and 222 contain a pointer to the application's mapped memory allocator and 224 and 226 contain pointers to the application's handle mapper and handle unmapper functions, respectively. Fields 228 and 230 contains pointers to the application's fixed (i.e., real) memory allocator and fixed memory deallocator functions, respectively. Fields 232 and 234 contain pointers to the application's loader and unloader functions, respectively. Field 236 contains a pointer to the application's "system" function which calls the operating system command shell.

Finally, field 238 contains a pointer to a location for storing data that is private to the interface. And, field 240 contains a pointer to at least one registration file (to be described below) that identifies the drivers and data bases available to the application.

A driver obtains memory from the application's memory manager, not directly from the operating system. Field 220 of ENVBLK 200 identifies a pointer to a call back function to the application's memory allocator. This allocator returns a memory handle that may have to be mapped, depending on memory type, before the driver can use it. An application supports one of three types of memory managers, namely, NOT_MAPPED, MUST_MAP, and MUST_UNMAP.

If the memory type specified in field 212 of ENVBLK 200 is NOT_MAPPED, then all handles passed across the interface are pointers to real memory. In contrast, in a MUST_MAP environment, all handles passed between the application and the driver must be mapped in order to obtain pointers to memory. In such an environment, the driver's calls to the application's map function, whose address is in field 224 of ENVBLK 200, must precede all references to mapped memory.

In some environments, such as the DOS environment, only four pointers to mapped memory are available at one time. The application passes the number of map registers it supports in field 210 of ENVBLK 200. Pointers obtained by mapping remain valid until another handle is mapped into the same map register.

Finally, in the third type of memory environment, MUST_UNMAP, the driver must make a call to an unmap function to release mapped memory.

Figure 5:
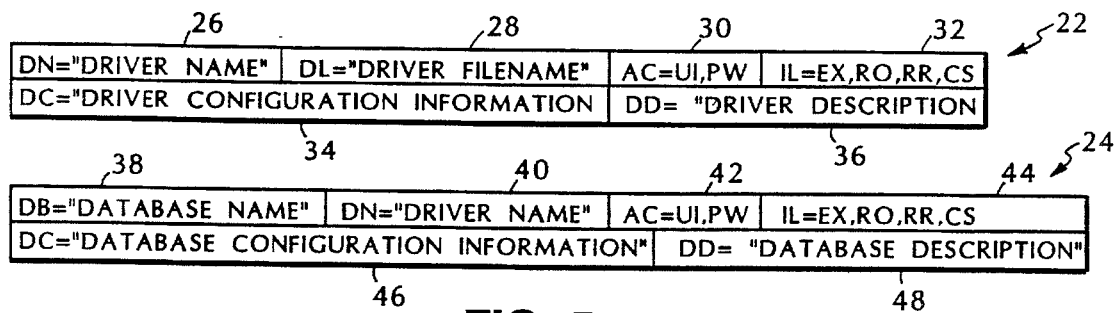
FIG. 5 illustrates a driver record and a database record.

To construct registration data structure 150 shown in FIG. 3, the init_interface function uses information that is stored in a registration file 20 (shown in FIG. 1). Registration file 20 is an ASCII text file that can contain two types of records, namely, one or more driver records 22 and zero or more database records 24 (shown in FIG. 5).

Driver record 22 consists of two required parameters and four optional parameters. Each driver record 22 must include a driver name parameter (DN) followed by the driver name (i.e., DN="Drivername") (field 26). DN identifies the record as a driver record and must be the first parameter in the record. The driver name is the name returned to application during driver browsing and the application uses it to connect to the driver. Driver record 22 must also include a driver location parameter (DL) followed by the file name of the dynamically loadable driver library (i.e., DL="DriverFilename") (field 28).

The four optional parameters in the driver record include an access control parameter (AC=UI,PW) (field 30), an isolation level parameter (IL=EX,RO,RR,CS) (field 32), a driver configuration parameter (DC="Driver Configuration Information") (field 34) and a driver description parameter (DD="Driver Description") (field 36). The access control parameter specifies that a user id (UI) and/or a password (PW) must be provided when connecting to the driver. The isolation parameter specifies that an isolation level may be specified when the application connects to the driver. The available isolation levels are EX indicating single user exclusive access to all databases; RO indicating read-only access to all databases; RR indicating read-repeatable access to all databases; and CS indicating cursor-stable access to all databases. If the driver configuration parameter is present, it contains configuration information that can be used by the driver. Finally, the driver description, if present, is passed to the application during browsing to provide documentation about the driver.

Database record 24 has a similar structure to that of driver record 22. It consists of two required parameters and four optional parameters. One of the required parameters is a database name parameter (DB) followed by the database name (i.e., DB="Databasename") (field 38). DB identifies the record as a database record and must be the first parameter in the record. The database name is the name returned to the application during database browsing and the application uses it to connect to the database. The second required parameter is a driver name parameter (DN) followed by the name of the driver with which that database is associated (i.e., DN="Drivername") (field 40). The DN parameter in the database record links that record to the driver.

The four optional parameters in the database record correspond to the four optional parameters in the driver record. They include an access control parameter (AC=UI, PW) (field 42), an isolation level parameter (IL=EX,RO,RR, CS) (field 44), a database configuration parameter (DC= "Database Configuration Information") (field 46) and a database description parameter (DD="Driver Description") (field 48).

When first invoked through the init_interface function, interface 2 locates registration file 20 by using, for example, the operating system search mechanisms. Upon finding registration file 20, it is loaded into active memory and interface 2 then uses it to build registration data structure 150.

The registration data structure is a linked list of driver blocks 152, each of which contains a group of fields (fields 154 through 168) for storing information about a different driver that is available to the interface. Field 154 contains the identity of the next driver block 152 and thus locates driver block 152 in the linked list of driver blocks. By traveling down the chain identified by the entries in field 154, all available drivers can be identified. To identify the end of that chain, the last driver block contains a Null pointer in field 154.

The other fields 156 through 168 of each driver block 152 contain driver-specific information. In particular, field 156 contains a pointer (referred to as a child pointer) to the first member of a linked list of database blocks 170 identifying the databases that are available to that driver. Field 158 contains a pointer to the name of the driver. Field 160 contains a pointer to the location of the driver. Field 162 contains a pointer to the description string for that driver.

Field 164 contains a pointer to the driver configuration string for that driver. Field 166 contains the isolation and access flags. And, field 168 contains a use count which is the number of established connections to that driver.

Note that more than one application can open a driver (i.e., establish connectivity to it) at the same time and any application can establish more than one connection to a driver. The use count is the total of all such connections and is used to determine when underlying data structures that support the connection can be freed up without disrupting other existing connections to the driver.

The structure of database block 170 is similar to that of driver block 152. The first entry (field 172) in each database block 170 contains a pointer to the next database block 170 in a linked list of databases associated with a given driver. The last database block 170 in the chain contains a Null pointer in this field to indicate no other blocks follow it.

The remaining fields 174 through 184 in database block 170 contain the database-specific information. In particular, field 174 contains a pointer to the name of the driver. Field 176 contains a pointer to the name of the database. Field 178 contains a pointer to the description, string for that database. Field 180 contains a pointer to a database configuration string. Field 182 contains the isolation and access flags. And, field 184 contains a use count which is the number of established connections to that database. The use count in the database block 170 serves a similar purpose to that of the use count in driver block 152.

Figure 6A:
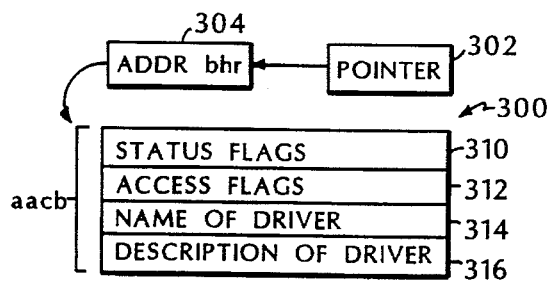
FIGS. 6A and 6B illustrate a driver browsing handle and a database browsing handle, respectively.

After the init_interface function has completed its tasks, the application calls an open_driver_browser function (step 104 of FIG. 2A). Referring to FIG. 6A, this function identifies a driver browsing handle 300 which will be used to pass browser information to the application. More specifically, application 4 passes a pointer 302 to a location where interface 2 places a pointer 304 to driver browsing handle 300. Driver browsing handle 300 is a data structure that is allocated and initialized by interface 2. It includes fields 310 through 316 for communicating certain driver-specific information to application 4. Fields 310 and 312 are used to carry status and access flags. These include driver-specific information relating to whether a user id and/or a password is required, whether isolation level is selectable and the types of isolation that may be selected. Field 314 is used for the name of the driver and field 316 is used for the driver description, if one exists.

Once driver browsing handle 300 is available, the application positions it on a particular driver by invoking a get_next_driver function (step 106). When this function is first called, interface 2 positions driver browsing handle 300 on the first driver block 152 identified in registration data structure 150 (see FIG. 3) and returns information about that driver by filling in fields 310 through 316 with the relevant driver-specific information. By repeatedly invoking the get_next_driver function, interface 2 moves down the chain of driver blocks 152 in registration data structure 150 one at a time, each time returning information about the relevant driver. When interface 2 reaches the last driver block 152, the next invocation of get_next_driver returns an END_OF_DATA message, indicating that there are no other driver blocks 152 in the list. As driver browsing handle 300 identifies the list of available drivers, the application stores that information in another data structure (not shown) for future reference.

After details about the identity and properties of the drivers are obtained, application 4 calls a delete_driver_browser function to close driver browsing handle 300 and allow interface 2 to free the appropriate resources (step 107).

Figure 7:
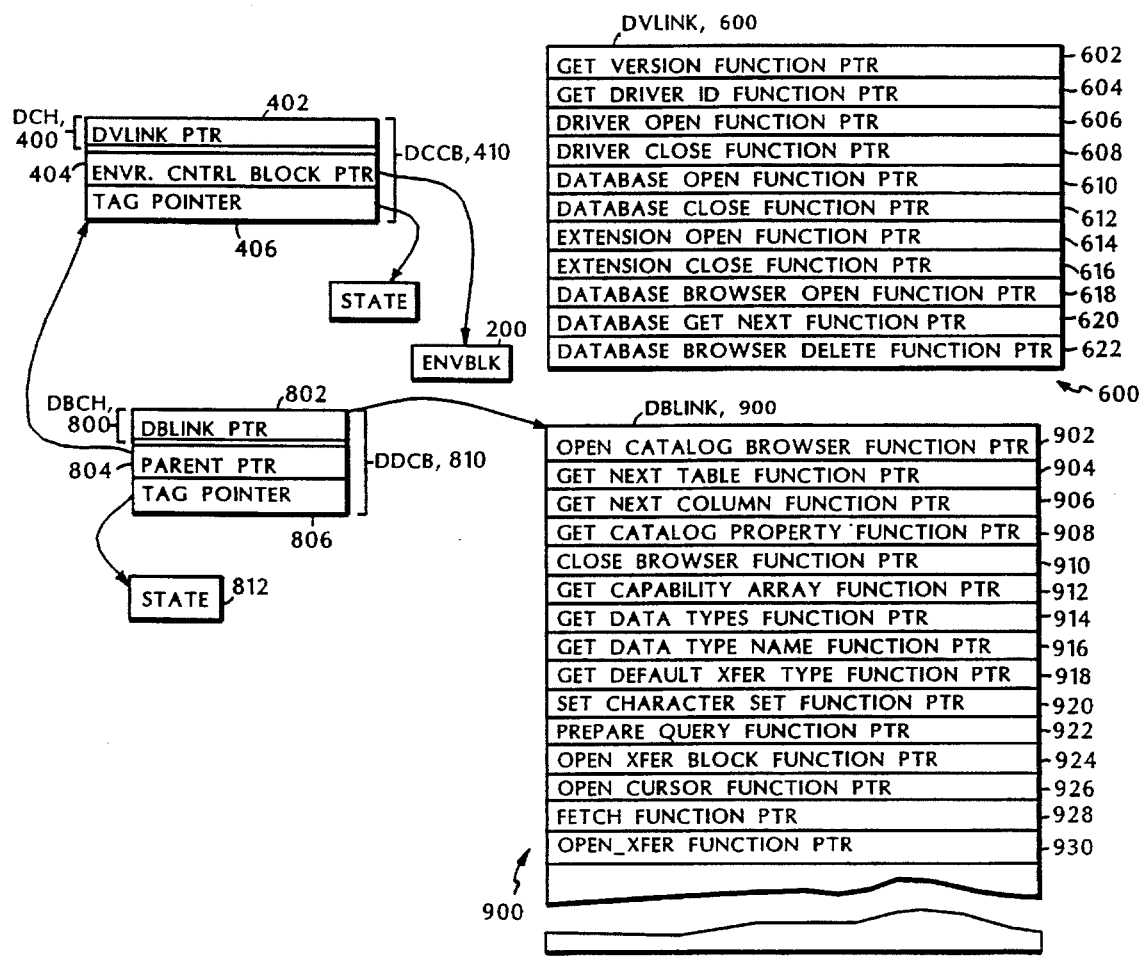
FIG. 7 illustrates various data structures including a driver connection control block and a database connection control block.

To establish connectivity to a particular driver, the application invokes an open_driver function (step 108 in FIG. 2A). The open_driver function identifies a segment of memory where interface 2 can store a driver connection handle 400 (DCH) that will be used to access the functionality of the driver (see FIG. 7). DCH 400 is part of a larger block of memory that is allocated by the application and that is referred to as driver connection control block 410 (DCCB). As shown in FIG. 7, there are at least three fields in driver connection control block 410, namely, fields 402 through 406. Field 402 is for a pointer to a driver connection function vector 600 (DVLINK) to be described later. Field 404 is for a pointer to ENVBLK 200. Field 406 is for a driver-specific data area that may be allocated and used by the driver for driver-connection-specific state information (this is also referred to as the TAG area). The application has access only to driver connection handle 400 (and, in turn DVLINK 600) and not to the entire driver connection control block 410. In contrast, the driver has access to the entire driver connection control block 410.

Besides setting up driver connection handle 400, the open_driver function also causes interface 2 to determine whether the driver has been loaded into active memory yet (step 110). It does this by relying on the record of loaded code that is generated and maintained by a loader mechanism that is available through application 4. If the driver has not been loaded, a dynamic load call is made to the loader instructing it to load the driver into active memory (step 112).

Immediately after loading the driver, interface 2 makes an init_driver call which returns the address of DVLINK 600 (step 114). The init_driver call represents the only visible procedure call from outside a driver before that driver is opened. The init_driver call returns a pointer to DVLINK 600 which interface 2 then loads into driver connection handle 400. DVLINK 600 is a data structure identifying multiple entry points into the driver. Each entry point represents a procedure call that the application can make to the driver, and each identified procedure call relates to some aspect of discovering, establishing and managing connections that the driver can make to its available databases.

Interface 2 also places a pointer to ENVBLK 200, which it received from the application as an argument to the open_driver call, into field 404 of driver connection control block 410.

Referring to FIG. 7, fields 602 and 604 of DVLINK 600 relate to functions which return information about the driver that is required by the application. Fields 606 and 608 relate to functions for opening and closing the driver connection. Fields 610 and 612 relate to functions for opening and closing a database connection. Fields 614 and 616 relate to functions for extending the functionality associated with a database connection. Fields 618, 620, and 622 relate to functions for browsing the databases available to that driver. Each of these functions will be described in greater detail during the course of the following description of the typical sequence of function calls that is required for establishing connectivity to a particular database.

After the init_driver call (if it was determined in step 110 that the driver had not previously been loaded) and before any other driver functions are called, interface 2 makes a driver_open call through the driver (see field 606 of DVLINK 600) (step 116). This driver_open call completes the open_driver call made by the application in step 108. The driver_open call completes the driver connection control block 410 by filling in the TAG area, namely, field 406, with driver-specific data. When the driver_open function finishes, the application has connectivity to the driver and can make calls through the driver, using the pointers stored in DVLINK 600 to invoke its functionality.

Once the application establishes a connection to a driver, it uses two function calls that are available through DVLINK 600 to obtain certain driver-specific information that will be required to make the subsequent function calls for establishing connectivity to a database. The calls are a get_API_version call (step 118) identified by the pointer in field 602 and a get_driver_id call (step 120) identified by the pointer in field 604. The get_API_version function establishes the version of interface 2 that the driver will be supporting. The get_driver_id call returns a pointer to a driverid data structure which contains driver identification information. The driverid data structure is allocated by the application and when the get_driver_id call is made, it is filled in by the driver. The driverid data structure contains, for example, the name of the manufacturer of the driver; a pointer to the driver's name; a pointer to the version number of the driver; and information about the character sets that are supported by the driver.

After establishing connectivity to a driver and obtaining the required information about the driver, the application uses a set of database browser functions to discover information about available databases. These functions are analogous to and operate similarly to the driver browser functions calls previously described.

Figure 6B:
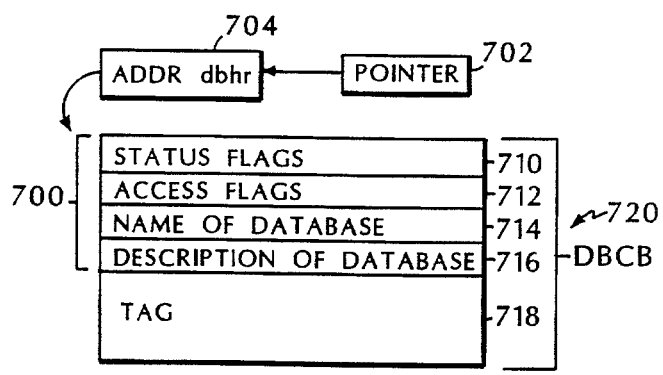

To utilize the database browser functions, the application makes an open_database_browser call (step 122). This call initializes a database browsing handle 700 which is a data structure that is allocated by the application and which will be used to pass database browser information to the application (refer to FIG. 6B). The application uses database browsing handle 700 to browse through lists of database blocks 170 in registration data structure 150 so as to identify databases to which it can connect. Database browsing handle 700 includes fields 710 through 716 for communicating certain database-specific information to the application. Fields 710 and 712 are used to carry status and access flags. These include information relating to whether a user id and/or a password is required, whether isolation level is selectable and the types of isolation that may be selected. Field 714 is used for the name of the database and field 716 is used for the database description, if one is available.

Database browsing handle 700 is the first segment of a larger database browser control block (DBCB) 720 that includes an additional field 718 assigned to be the drivers work area (also known as TAG area 718). The application only has access to database browser handle portion of the DBCB; while the driver has access to the complete database browser control block.

To open database browsing handle 700, the open_database_browser call invokes a database_browser_open function that is identified by a pointer in field 618 of the DVLINK for the associated driver. The database_browser_open function is actually invoked twice. The first time it is called, it computes the size of the database browser control block and the application allocates the required amount of memory. The second time the open_database_browser is invoked, the driver fills in the driver-specific area (i.e., TAG area 718) and performing any driver initialization that must occur once per driver connection.

After database browsing handle 700 has been opened, the application can use it to discover the available databases. To accomplish this, the application makes a database_get_next call through the driver by using the pointer in field 620 of the DVLINK (step 124). If this is the first time that this call has been made for that driver, the database_get_next call positions database browsing handle 700 on the first database in the registration data structure that is associated with that driver (as identified by the child pointer in field 156 of driver block 152, as shown in FIG. 3). The driver then fills in database browsing handle 700 with the relevant information for that database, thereby identifying the database to the application. The application stores at least some of this information in a private data structure (not shown) for later use.

The application obtains a complete list of databases associated with that driver by repeatedly calling the database_get_next function. Each time that the function call is made, database browsing handle 700 moves to the next database block 170 in the linked list. When it reaches the last database block as identified by a Null pointer in next field 172 of that block, subsequent calls of the database_get_next function returns an END_OF_DATA message indicating that there are no other databases to be browsed.

Prior to establishing connectivity to one of the databases identified through the database browsing functions, the application calls a database_browser_delete function, by using the pointer in field 622 of DVLINK 600, to close (i.e., deallocate) database browsing handle 700 (step 126). Then, the application makes an open_database call which allocates a section of memory for storing a database connection handle (DBCH) 800 and returns a pointer to that location (step 128).

Database connection handle 800 is part of a larger block of memory that is allocated by the application and that is referred to as database connection control block 810 (DDCB). As shown in FIG. 7, database connection control block 810 has at three fields, namely, fields 802 through 806. Field 802 is for a pointer to a database connection function vector 900 (DBLINK), to be described. Field 804 is for a pointer to driver connection control block 410 with which this database is associated (designated parent pointer). And field 806 is a TAG pointer to a database-specific data area 812 that may be allocated and used by the driver for database-connection-specific state information. The application only has access to the database connection handle 800 of database connection control block 810 (i.e., to DBLINK 900); whereas the driver has access to the complete block.

After database connection handle 800 is identified, the application makes a database_open call through the driver (see field 610 of DVLINK) (step 130 of FIG. 2A). The database_open call completes database connection control block 810 by storing a pointer to DBLINK 900 in field 802, by storing a parent pointer in field 804, by filling TAG area 812 with database-specific data and by performing any other driver initialization that must be performed once per database connection. When the database_open function finishes, the application has connectivity to the database.

DBLINK 900 is a data structure identifying entry points in the driver for calls that the application can make to manipulate the database. For example, DBLINK 900 includes, among others, pointers to functions which may be used to browse the relations accessible through the database, pointers to functions that represent a set of basic capabilities common to all drivers, and a pointer to a function that returns information about the additional capabilities of (or functions supported by) the driver/database connection. A summary list of the calls available through DBLINK 900 is shown in FIGS. 8A through 8E with a short description of each. In the following description, some of these will be described in detail.

Note that some of the function calls in FIGS. 8A through 8E are marked by an asterisk (*). Those calls represent the minimum set (i.e., "basic set") of function calls that are supported by all drivers.

After establishing connectivity to the database, the application uses a group of functions that are available through DBLINK 900 to determine the database characteristics that will be needed to use other function calls available through DBLINK 900. The calls within this group are part of the basic capabilities common to all drivers. One of the first calls is to a get_capability_array function identified in field 912 of DBLINK 900 (step 132 of FIG. 2A). In preparation to making this call, the application allocates a segment of memory (referred to as a capability_groups data structure) for storing a capability array 1100 (see FIG. 9A). The get_capability_array call causes the driver to fill in the capability_groups data structure with the driver/databases capabilities (i.e., the operations which the driver/database supports). The capabilities specified in the capability array remain valid and available to the application as long as the database connection remains open.

Figure 9A:
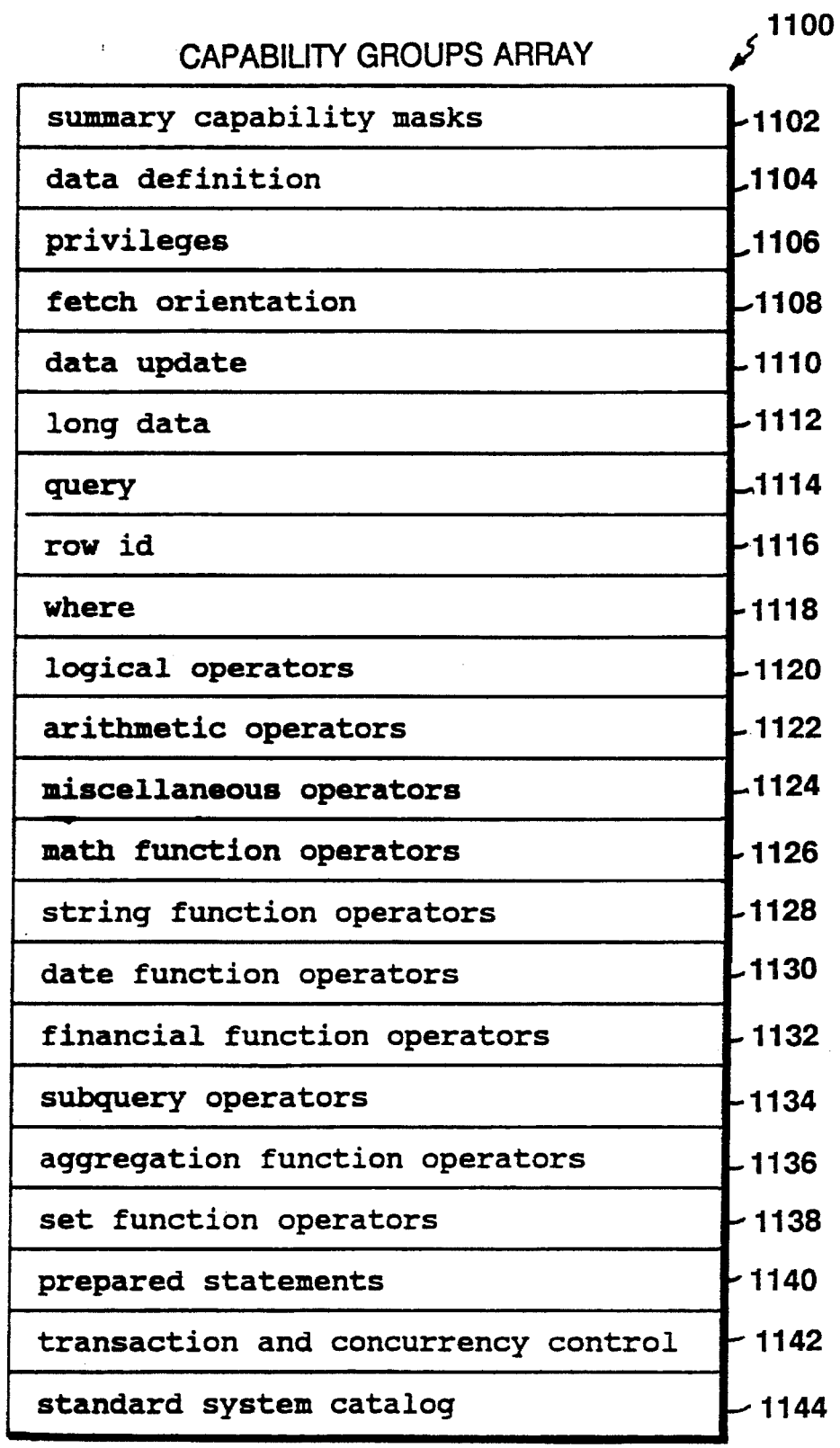

As shown in FIG. 9A, capability array 1100 contains a summary capability mask 1102 and 21 capability group masks 1104 through 1144, each of which is a 32-bit mask. The optional driver capabilities are organized into 21 logical groups. Each of capability group masks 1104 through 1144 corresponds to one of the logical groups and it contains up to 32 separate capabilities, each of which is represented by a different bit of the 32-bit mask. The capabilities identified in the groups are shown in FIGS. 9B through 9N. Each entry refers to an operation or capability that is found among the wide variety of commercially available database engines.

Summary capability mask 1102 is, like its name implies, a summary element of capability array 1100. Each of the first 21 bits of summary capability mask 1102 corresponds to a different one of capability group masks 1104 through 1144 of capability array 1100. A bit in summary capability mask 1102 is on if any capability within the corresponding capability group is present (i.e, if any bit in the corresponding capability group is on).

One example will be described to make this more explicit. Capability mask 1126 is the math function operators capability mask. It identifies sixteen math operators that could be supported by the driver/database, including, among others, arc sine and arc cosine operators, a base ten logarithm operator, a square root operator, etc. The presence of any of those operators is indicated by the corresponding bit in the capability mask being on. If any bit in the math function operator capability mask 1126 is on, then the bit in summary mask 1102 that corresponds to the math function operators mask (i.e. bit 1150 in FIG. 9B) is also on. On the other hand, if none of the operators associated with math function operator capability mask 1126 is present (i.e., none of its bits are on), then the corresponding bit in summary mask 1102 is off.

Note that capability array 1100 identifies those capabilities that are in addition to the "basic set" of function calls mentioned above in connection with FIGS. 8A through 8E. In other words, if the driver supports only the "basic set" of function calls, then no bits in capability array 1100 will be on.

In addition to the get_capability_array call, there are four other functions available through DBLINK 900 for retrieving database characteristics (FIG. 7). They are: a get_data_types function which may be called through a pointer in field 914, a get_type_name function which may be called through a pointer in field 916, a get_default_xfer_type function which may be called through a pointer in field 918 and a set_charset function which may be called through a pointer in field 920 (step 134 of FIG. 2A). Each of these will now be briefly described.

The get_data_types function obtains a handle to an array of data types that are supported by the database. Each byte of the array contains a standard or extended data type and the array is terminated by a null byte. The standard data types are grouped into four families, namely, numeric, text, byte and datetime. Every driver supports at least one of these data type families. Any driver that supports a type family must also support conversion between any types within that family. In the described embodiment, the drivers are not required to support conversion between families.

Drivers that support the standard numeric family transfer data to and from the application in physical representations which are dependent on the hardware and software platform of the application. The numeric family includes the following types:

16 bit unsigned integer treated as a boolean logic value with 0 representing FALSE and any other bit pattern representing TRUE;

Double precision floating point;

Single precision floating point;

32 bit signed integer;

16 bit signed integer;

16 bit unsigned integer;

packed decimal.

Drivers that support the text family transfer character data as strings of a particular character set. The text family includes the following types:

Varying-length string;

Fixed-length string, padded with blanks;

Long string, access via handle.

Drivers that support the byte family transfer columns of these types as arrays of bytes. The byte family include the following types:

Varying-length string;

Fixed-length string;

Long string, access via handle.

Drivers that support the datetime family transfer date and time data as numeric values. the datetime family includes the following types:

Number days in integer, day fraction;

Number days only, day fraction ignored;

Day as fraction only, integer ignored;

Number days only (must be integer);

Number seconds only (must be integer).

Extended data types are defined by drivers whose databases do not store all their data in types that can be converted to one of the standard types. The driver defines extended types as bytes with the high order bit set to one. Extended type data can be transferred unconverted if the driver and the application agree to the format of the data. Otherwise, the driver must convert extended type data to one of the standard types.

The get_type_name function obtains the name of the data type that the driver supports. The application can display this name to the end user to indicate the type of a column in the database.

The get_default_xfer_type function obtains the default standard data type that the driver uses to transfer data for a column with the specified standard or extended data type. Values of the specified standard or extended data type are converted to the default standard data type when data is transferred from the application to the driver.

Finally, the set_charset function informs the driver which character set it should use for strings in the database. If the driver is capable of handling databases with different character sets, it reports this by means of an array in the driverid data structure returned by the get_driver_id function call described earlier. The database defaults to the first character set in the array.

After the application has retrieved the above-described information about the driver/database interface, the application must obtain sufficient information about the database so that the application can construct and execute data management commands. To this end, there are a set of catalog browser functions which can be used to learn details about the identity and properties of the tables and columns of the database. All drivers support the catalog browser functions which will now be described.

To use the catalog browser, the application calls open_cbrowser (step 136 in FIG. 2A) which is identified by the pointer in field 902 of DBLINK 900 (see FIG. 7). The open_cbrowser function creates a catalog browsing handle for the catalog of the specified database. Other catalog browser functions, namely, get_table_next and get_column_next, are available to position the catalog browsing handle at a table or at a column in the current table, respectively (step 138 of FIG. 2A). The catalog browsing handle allows that driver to keep state, that is, to remember the table and the column at which it is positioned as the handle is moved about. After the catalog browsing handle is positioned by using some sequence of get_table_next and/or get_column_next calls, it will be in one of five states, namely, UNPOSITIONED, AT_TABLE, AT_COLUMN, END_OF_TABLE and END_OF_DATABASE. Browsing can proceed either sequentially through tables and columns or selectively, locating tables and columns by name.

The get_table_next function positions the catalog browsing handle at a table in the database. When that function is first called after an open_cbrowser call (and assuming no table name is supplied), the catalog browsing handle goes to the first table in the database. If an argument identifying an existing table name is supplied to this function, the catalog browsing handle is positioned at the identified table. If the supplied name is Null, then calling this function merely moves the catalog browsing handle to the next table in the database. Thus, the entire list of tables can be covered by repeatedly calling get_table_next until all of the tables have been browsed. When the catalog browsing handle reaches the last table in the database, the next call of get_table_next returns an END_OF_DATA message, indicating that there are no more tables to browse.

The get_column_next function operates in a manner similar to that of the get_table_next function, except it works with regard to columns instead of tables. When the get_column_next function is first called after the catalog browsing handle is positioned at a table (and assuming no column name is supplied to the function), the catalog browsing handle goes to the first column in the table. If an argument identifying an existing column name is supplied to this function, the catalog browsing handle is positioned at the identified column. If the supplied name is Null, then calling this function merely moves the catalog browsing handle to the next column in the database. As with the get_table_next function, all of the columns in the table can be browsed by repeatedly calling the get_column_next function. When the catalog browsing handle reaches the last column of the table, the next call of get_column_next returns an END_OF_DATA message, indicating that there are no more columns to browse.

Table I, below, summarizes the catalog browsing handle state transitions in response to the different the catalog browser function calls.

TABLE I

| Function | State Before | Return | State After |
|---|---|---|---|
| open_cbrowser | NA | SUCCESS | unpositioned |
| get_table_next | unpositioned | SUCCESS | at (first) table |
| | | END_OF_DATA | end of database |
| | at table | SUCCESS | at (next) table |
| | | END_OF_DATA | end of database |
| | at column | SUCCESS | at (next) table |
| | | END_OF_DATA | end of database |
| | end of table | SUCCESS | at (next) table |
| | | END_OF_DATA | end of database |
| | end of database | END_OF_DATA | end of database |
| get_column_next | unpositioned | UNPOSITIONED | unpositioned |
| | at table | SUCCESS | at (first) column |
| | | END_OF_DATA | end of table |
| | at column | SUCCESS | at next column |
| | | END_OF_DATA | end of table |
| | end of table | END_OF_DATA | end of table |
| | end of database | END_OF_DATA | end of database |

When the catalog browsing handle is positioned where desired, the application then calls a get_catalog_property function to return descriptive information about the current object (i.e., either a table or a column depending upon where the catalog browsing handle is positioned) (step 140 of FIG. 2A). This function returns the property or value of a specified type. The arguments to this function include a type and a buffer that is allocated by the application. The driver returns the property or value of the specified type by writing it into the buffer. The types which may be specified include the following:

TABLE II

| Property Type | Value Returned |
|---|---|
| PR_TYPE_NAME | A string that contains the name of the current table. |
| PR_TAB_DESC | A string that contains the description of the current table. |
| PR_NUMCOLS | A signed integer that contains the number of columns in the current table. |
| PR_COLUMN_TYPE | An unsigned integer that contains the column data type. |
| PR_COLUMN_WIDTH | An unsigned integer that is the maximum width of the column. |
| PR_COLUMN_FLAGS | An unsigned integer that is interpreted in the same way as the flags in the coldef data structure. |
| PR_OWNER | A string that contains the name of the owner of the current table. |
| PR_COLUMN_NAME | A string that contains the name of the current column. |
| PR_COLUMN_DESC | A string that contains the description of the current column. |
| PR_COLUMN_LABEL | A string that contains a column label. |
| PR_COLUMN_SCALE | A signed integer that indicates the |

TABLE II-continued

| Property Type | Value Returned |
|---|---|
| | number of digits right of the decimal point. |
| PR_TAB_TYPE | An unsigned integer that contains the object type (i.e., a table, a view, a synonym or a public synonym). |
| PR_TAB_LABEL | A string that contains the label for |

TABLE II-continued

| Property Type | Value Returned |
|---|---|
| | the current table. |

Of course, any particular property listed in Table II is only available when the catalog browsing handle is positioned at the appropriate object (i.e, table or column, depending on what the property is).

The get_table_next, the get_column_next and the get_catalog_property functions are used repeatedly to retrieve whatever amount of information about the database is desired. After details about the identity and structure of the tables and columns in the database are obtained, the application calls a close_cbrowser function through a pointer in field 910 of DBLINK 900 to close the catalog browsing handle (step 142).

Using the information retrieved through the catalog browsing functions, the application uses other function calls available through DBLINK 900 to interrogate, manipulate and change the database. Among the more important of the functions available are the prepare_query call (see FIG. 7, field 922), the open_xfer call (field 924), the open_cursor call (field 926), and the fetch call (field 928). Beginning with the prepare_query call, each of these will now be described as part of the continuing description of a typical sequence of function calls.

When the time comes to query the database, the application makes the prepare_query call (step 144 of FIG. 2B) which compiles a query specification presented by the application. The result of the compilation is either a cursor that the driver uses to fetch data, or a handle to a statement that the driver saves. If the result of the compilation is a statement handle, the application can pass the statement handle to a declare_cursor call (see FIG. 8) at a later time to create a cursor.

Typically, the query will be presented to the application in a higher level language such as its own user interface. Before making the prepare_query call to the driver, however, the application converts the query into a query tree representation and stores this in a querytree data structure 1300, such as is shown in FIG. 10. Thus, when the time comes for the application to specify the query to the driver, rather than passing the SQL representation of the query to the driver, it passes querytree data structure 1300.

Querytree data structure 1300 contains the following information. Field 1302 contains a handle to an array of table names that are used in the query. Field 1304 contains a handle to a columns array which is an array of column id structures that are referenced in the query. Each column id structure in this array identifies a column by name, by number, as an expression or as an unnamed column that contains a row identifier. Field 1306 contains a handle to an array of wherenodes that represent the selection criteria for the query (see below for description of wherenode structure). This wherenode array corresponds to the WHERE clause of an SQL SELECT statement. Field 1308 contains a handle to another array of wherenodes that represent other selection criteria for the query. This wherenode array corresponds to the HAVING clause of an SQL statement. Field 1310 contains a handle to a data structure that represents the projected column list for the query. Field 1312 contains a handle to a data structure that corresponds to the GROUP BY clause in an SQL SELECT statement. Field 1314 contains the number of tables that correspond to the FROM clause of an SQL SELECT statement. Field 1316 contains an index identifying the first table referenced in the FROM clause of the SQL SELECT statement. Field 1318 contains the total number of elements in the columns array. Field 1320 contains a flag (referred to as the distinct flag) to indicate whether the query is to return duplicate records.

Note that fields 1306, 1308 and 1312, for example, are used to carry valid handles (i.e., non null values) only when the driver/database supports the associated capability, as indicated by the capabilities array. That is, field 1306 corresponds to the QUERY_WHERE capability (e.g. the WHERE clause of an SQL statement); field 1308 corresponds to the QUERY_HAVING capability (e.g. the HAVING clause of an SQL statement). And, field 1312 corresponds to the QUERY_GROUP capability (e.g. the GROUP BY clause in the SQL SELECT statement).

As noted, arrays of wherenode structures are used to specify expressions. They are also used to transfer data in update operations (e.g. a command to update a row) and insert operations (e.g. a command that inserts a row of values into a specified table). An expression is represented by one or more wherenode structures that are linked by node indexes. Wherenode structures are used both to implement the WHERE clause of an SQL SELECT statement and to encode expressions that are to be interpreted to obtain the value of a computed column. Thus, the wherenode structure varies depending upon its use.

For the case of operators, a wherenode structure 1400 is shown in FIG. 11. Field 1402 contains the type designation (also referred to as nodeclass) which, in this case, is operator. Since there are a significant class of operators that require three arguments, wherenode structure 1400 is capable of representing three children for each wherenode. Thus, fields 1404, 1406 and 1408 contain pointers to a left child node, a right child node and a third child node, respectively.

Returning to the prepare_query call, depending upon the capabilities of the driver, the application may also specify how the prepare_query call should process the results of the query. For example, if the driver has QUERY_ORDER capability, the application can supply a data structure which specifies both the columns by which the query results are to be sorted and the column order in which that sort should occur. And for each column, the application can also indicate through an array of order direction flags whether the sort is in ascending or descending order. If the driver supports the QUERY_FOR_UPDATE capability, the application can supply an array of indexes to columns that are to be marked as reserved for an update during the current transaction.

If the driver supports at least one of the fetch orientation capabilities specified in the capabilities array, the application can set a scroll argument in the prepare_query call to specify whether the cursor should support fetch orientations other than NEXT_ROW.

A basic capability of the prepare_query call that is supported by all drivers is the ability to create a cursor (including the generation of its cursor handle). The application supplies a pointer (referred to as curptr) identifying a location at which the cursor handle is to be created. The prepare_query then creates the cursor handle at that location. Some drivers, however, have the added capability of being able to store the compiled query and assign a statement handle for the stored query (see STMT_HANDLE capability in capabilities array). When this capability is present and if the value of curptr is NULL, then the prepare_query call compiles and stores the query and then stores a handle to that query (i.e., the statement handle) at another location specified by the application. The application can then use the statement handle later to create a cursor with a call to a declare_cursor function.

After the prepare_query function has been called, the application calls the open_xfer function to allocate a data transfer buffer that can be used to transfer column data to the application (step 146 of FIG. 2B). Referring to FIG. 12, the application allocates a segment of memory for transferring data (transfer block 1500) and supplies a pointer to this transfer block to the driver via the open_xfer call. The driver fills in the header of the transfer block (referred to as the xferblock header 1502) with a handle (field 1508) to an array 1504 of data structures (referred to as xferdef structures 1506) that is allocated by the driver and that corresponds to the columns in the query result. Xferdef array 1504 contains one xferdef structure 1506 for each column whose values are to be transferred. To aid in generating xferdef structures 1506, the application supplies the cursor handle which it received from the driver in step 144. The remainder of xferblock header 1502 carries information about the number and identity of the columns which are to be projected (field 1510) as well as the names of the tables to which the columns belong (field 1512). The application also specifies the number of elements in xferdef array 1504 (field 1514).

Each xferdef structure 1506 includes fields 1516 through 1526 for transferring the following information to the application. Field 1516 is for a pointer to a dataval data structure that carries the value to be transferred to the application as well as an indication specification of data type. Field 1518 is for an indicator which is set each time that the application makes a fetch (to be described). The indicator is used either to indicate that the fetch was successful or to provide information about the value in field 1516. For example, the indicator may indicate that a driver-specific error occurred, or that the field value is null or that the field value is a missing value. Field 1520 is for an index into the columns array identified in field 1510 of xferblock 1502; it identifies the column whose value is being transferred. Field 1522 is for reporting the length of the column in the database. Field 1524 is for identifying the native data type of the column in the database, i.e., the driver sets this equal to the native data type of the data that is stored in the database. The value of the native data type must be either a standard data type or an extended data type. Field 1526 is for identifying the data type of the value that will be actually transferred to the application. The driver sets this equal to one of the standard data types mentioned above.

Note that the application can effectively negotiate with the driver in selecting the data type to be used for the transferred values. After the driver has identified, through the entry in field 1526 of xferdef structure 1506, the data type that is to be transferred, the application can change this to a different data type by calling an alter_xfer function that is available through the pointer in field 930 of DBLINK 900 (see FIG. 7). As an argument in the alter_xfer call, the application supplies a handle to a null-terminated array of any standard data types or extended data types agreed to by the driver and the application. In other words, if the application learns that the driver supports extended data types, it may through the alter_xfer call agree to accept data transfer using those extended types. On the other hand, the application may specify a standard data type, different from the data type specified by the driver in the xferdef structure, as the data type into which the database data will be converted before that data is transferred to the application. Thus, for example, the driver may initially specify its transfer data type as floating point and the application may then use the alter_xfer call to change the transfer data type to any one of the integer forms that is supported by the driver. (Recall that the driver must support all data types within a family.)

To determine the extended data types that are supported by the driver, the application can use the get_data_types call available through the pointer in field 914 of DBLINK 900 (described earlier). If the application determines that it supports the identified extended data type, it can then use the alter_xfer call to accept that extended data type.

Once a transfer block 1500 has been allocated and initialized, the application makes an open_cursor call through a pointer stored in field 926 of DBLINK 900 (step 148 of FIG. 2B). The open_cursor call causes the driver to execute the query implied by the specified cursor. The open_cursor call also has the capability of passing an array of argument values to the wherenodes of nodeclass parameter in the querytree. This mechanism allows the query to be compiled once by the prepare_query call and then executed many times with different values for the terms of its selection expression. The open_cursor call produces a result set containing the results of the query and it positions the cursor handle before the first row of the result set.

To obtain the results of the open_cursor call, the application makes a fetch call (step 150 of FIG. 2B) through a pointer in field 928 of DBLINK 900 (see FIG. 7). The fetch call positions the cursor handle toga specified row in the result set and fills in the xferdef array with the contents of that row. The application can control the positioning of the cursor handle through an argument (referred to as dir) that it passes to the fetch call. All drivers must support a dir value of NEXT_ROW, which positions the cursor handle at the next row in the result set. To pass any other value to the driver, the driver must have the corresponding fetch orientation capability. The following is a list of permissible orientations and their meaning:

| | |
|---|---|
| NEXT_ROW | move to next row |
| PREV_ROW | move to previous row |
| FIRST_ROW | move to first row |
| LAST_ROW | move the to last row |
| RELATIVE_ROW | move nrows from current row |
| ABSOLUTE_ROW | move to row nrow |

The variable nrow refers to another argument of the fetch call that indicates the row at which to position the cursor handle. If the value of dir is RELATIVE_ROW, the driver positions the cursor handle nrows away from the current row on which it is positioned. In this case, the value of nrows cannot equal zero unless the driver has FETCH_SAME capability. If the value of dir is ABSOLUTE_ROW, the driver positions the cursor handle at the row of the current result set specified by nrows. In this case, the value of nrows must be greater than zero. For all other values of dir, the value of nrows is ignored.

The fetch call also accepts a flag (referred to as block) which indicates whether the fetch call should wait until data is available before returning to the application. If block is TRUE and the driver has FETCH_ASYNCH capability, the fetch call does not return until a record is available. If block is FALSE, the fetch call may return NO_DATA_YET. This implements the separation of query execution and data return and, depending on the application, allows the application to perform work while waiting for the availability of records from the database. Drivers that do not implement asynchronous fetch, typically ignore the value of block.

By repeatedly calling the fetch call using NEXT_ROW as an argument, the application can retrieve all of the records in the result set. When the cursor handle reaches the end of the result set, a subsequent fetch call returns END_OF_DATA, indicating that the cursor handle is positioned on or after the last row of the result set.

After the query of a particular database is completed, the application may use other functions that are available through DVLINK 600 and DBLINK 900 to terminate the connections. To completely terminate a connection to a driver, the application first closes the cursor by calling a close_cursor function identified in DBLINK 900 (step 152). The close_cursor call terminates the current inquiry for a specified cursor. The cursor handle, however, remains valid and may be reopened by the open_cursor call. The next step in terminating the connection is a close_xfer call also available through DBLINK 900 (step 154). The close_xfer call terminates operations on the specified transfer block. The driver may deallocate xferdef array 1504 and any driver-allocated buffers. The driver also stores Null pointers in fields 1510 and 1512 of xferblock header 1502 and sets the xfer count to zero in field 1514.

Next, the application deletes the cursor by calling a delete_cursor function available through DBLINK 900 (step 156). The delete_cursor call deletes the specified cursor handle and deallocates any resources that were allocated when the query associated with this cursor was compiled.

The application can now close the database connection by calling a database_close function identified by a pointer in field 612 of DVLINK 600 (step 158). The database_close call terminates a connection established by the database_open call and the driver deallocates any database-connection-specific memory that was allocated by the driver. This call also makes a close_database call to the interface to terminate a connection established by the open_database call (step 160). During this step, the interface may also deallocate any database-connection-specific memory.

After the database connection is terminated, the application terminates the connection to the driver by making a driver_close call through a pointer in field 608 of DVLINK 600 (step 162). This call terminates the connection established by the driver_open call and the driver deallocates driver-connection-specific memory. This call also makes a close_driver call to the interface to terminate the connection established by the open_driver call (step 164).

Finally, after the driver connection has been closed, the application makes a term_driver call to unload the driver from memory (step 166).

As a general rule, each driver and each application is responsible for freeing all the memory that it allocates. For certain buffers, there is an explicit function call (e.g. close_cursor or close_driver) that the application makes to the driver instructing it to free up the buffer. However, for all other buffers it is generally assumed that they have a one-call lifetime. That is, when a driver passes back a buffer as a result of one call, it can free that buffer on the next call. Examples of one-call lifetime buffers include any of the character strings that the driver returns as properties from the get_catalog_property call. Thus, unless specified, an application cannot count on a buffer's contents remaining intact after a get_next_driver call, for example.

When functions return one-call lifetime memory buffers, the driver must keep track of the buffers. In the described embodiment, no function returns more than one-call lifetime buffer. Furthermore, the functions that return such a buffer always have a database connection control block as an argument. The described embodiment uses these restrictions to keep track of one-call lifetime buffers. For example, the database tag structure contains a one-call lifetime handle structure, which has an allocated handle and the structures size. Thus, whenever the driver allocates a one-call lifetime handle, it first checks to see if the tag structure contains a one-call lifetime handle. If a handle exists, the driver frees it. The driver then copies the new handle and the buffer size into this structure.

When the application calls, for example, the driver_close function, the driver checks the one-call lifetime handle structure and frees any handle that is still allocated. This helps the driver insure that it frees all memory it allocated before the application unloads the driver.

Note that an application is permitted to have multiple connections and handles open simultaneously. For example, an application may wish to transfer data from one table to another in the same database. In this case, the application need only call driver_open and database_open once. However, the application may call each twice, once for the output table and once for the input table, thereby establishing a separate connection for each table. In addition, the application may wish to transfer data from one table to a second table in another database. The driver handles these situations by keeping all data associated with each connection and with each handle separate. To support this, the TAG areas in the driver connection block and the database connection block let the driver attach its own data structures to individual connections.

The system of FIG. 1 also includes an extension feature that permits a particular driver to define and add new functionality to the specification of the interface to the external data sources/sinks, beyond that which is defined by DBLINK 900 and capability array 1100. This feature is supported by two function calls available through DVLINK 600 (See FIG. 7), namely an extension_open function and an extension_close function identified by pointers in fields 614 and 616, respectively. The extension_open function is like the database_open function in that it generates parallel data structures to database connection control block 810 and to DBLINK 900. More specifically, application first makes an open_extension call as a consequence of which it allocates a section of memory for storing a driver extension connection handle (DECH) 1600 and returns a pointer to that location (see FIG. 13).

Extension connection handle 1600 is part of a larger block of memory that is allocated by the application and that is referred to as a driver extension connection control block 1610 (DECCB). As shown in FIG. 13, driver extension connection control block 1610 has at three fields, namely, fields 1602 through 1606. Field 1602 is for a pointer to a driver extension connection function vector 1700 (DEXLINK). Field 1604 is for a pointer to the driver connection control block with which this extension is associated (designated parent pointer). And field 1606 is a TAG pointer to a extension-specific data area 812 that may be allocated and used by the driver for extension-connection-specific state information. The application only has access to the driver extension connection handle 1600 of driver extension connection control block 1610 (i.e., to DEXLINK 1700); whereas the driver has access to the complete block.

After driver extension connection handle 1600 is identified, the application makes the extension_open call through the driver (see field 610 of DVLINK). The extension_open call completes driver extension connection control block 1610 by storing a pointer to DEXLINK 1700 in field 1602, by storing a parent pointer in field 1604, by filling TAG area 1612 with extension-connection-specific data and by performing any other driver initialization that must be performed once per extension connection. When the extension_open function finishes, the application has access to the extended capabilities represented by DEXLINK 1700.

DEXLINK 1700, like DBLINK 900, is a data structure identifying entry points in the driver for calls that the application can make to manipulate the database. The difference, however, is that DEXLINK 1700 represents driver-specific function calls that are not part of the overall specification and are in addition to the basic capabilities and the optional capabilities identified by capabilities array 1100.

The extension_close function terminates a connection established by the extension_open call and the driver deallocates any extension-connection-specific memory that was allocated by the driver. This call also makes a close_extension call to the interface to terminate the connection established by the open_extension call. During this phase of termintating the extension aspects of the connection step, the interface may also deallocate any extension-connection-specific memory.

Finally, note that more than one application may have more than one driver and/or databases open at the same time and that multiple applications may utilize the same connection to a given one of the drivers and/or databases.

Other embodiments are within the following claims.

What is claimed is:

1. A computer-implemented method for enabling an application program to connect to a selected one or more of a plurality of external data sources/sinks, said application program running on a computer having active memory, the method comprising:

providing a plurality of driver means, each of said driver means corresponding to a different subgroup of said plurality of external data sources/sinks;

in response to an inquiry from said application program, reporting to the application program the identity of each of the driver means of said plurality of driver means;

in response to the application program, selecting one of the plurality of driver means previously identified to the application program;

loading the selected driver means into active memory; and reporting to the application program a first plurality of entry points in said loaded driver means for a first plurality of function calls that said application program can make to said loaded driver means, said first plurality of entry points for use by said application program to make said first plurality of function calls directly to said loaded driver means, said first plurality of function calls including function calls for establishing and/or terminating connectivity to said loaded driver means.

2. The computer-implemented method of claim 1 wherein said first plurality of function calls includes browsing function calls which enable the application program to discover the external data sources/sinks.

3. The computer-implemented method of claim 1 wherein said first plurality of function calls includes function calls for establishing and/or terminating connectivity to a selected one of the external data sources/sinks associated with said loaded driver means.

4. The computer-implemented method of claim 3 further comprising reporting to said application program a second plurality of entry points in said loaded driver means for a second plurality of function calls that said application program can make to said loaded driver means, said second plurality of entry points for use by said application program to make said second plurality of function calls directly to said loaded driver means, said second plurality of function calls relating to accessing data in said selected external data source/sink.

5. The computer-implemented method of claim 4 wherein said second plurality of function calls includes catalog browsing function calls which enable the application program to discover tables of data that are available through said selected external data source/sink.

6. The computer-implemented method of claim 5 wherein said catalog browsing function calls are also for enabling the application program to discover columns within said tables.

7. The computer-implemented method of claim 6 wherein said second plurality of function calls includes a function call for returning a capability array for said data source/sink to the application program, said capability array identifying the capabilities of other of said second plurality of function calls.

8. The computer-implemented method of claim 7 wherein said capability array comprises a plurality of masks, each of said masks associated with a different logical group of capabilities.

9. The computer-implemented method of claim 8 wherein said capability array comprises a summary mask, said summary mask including an entry corresponding to each of the other masks of said plurality of masks, each entry indicating whether any of the capabilities of the corresponding logical group of capabilities is present.

10. The computer-implemented method of claim 1 wherein the step of reporting to the application program the identify of each of the driver means of said plurality of driver means comprises creating and establishing in memory a registration data structure that identifies to said application program the plurality of drivers and the plurality of external data sources/sinks available to said application program.

11. The computer-implemented method of claim 10 wherein the step of reporting to the application program the identity of each of the driver means of said plurality of driver means further comprises searching through said registration data structure so as to identify to the application program the drivers of said plurality of drivers.

12. A computer-implemented method for enabling an application program to access functionality of a selected external data source/sink, the method comprising:

in response to a connectivity request from said application program, establishing connectivity of the application program to said selected external data source/sink; and after said application program establishes connectivity with said external data source/sink, causing said selected external data source/sink to make available to said application program a browsing function for use by said application program to discover information about capabilities of said external data source/sink;

in response to use of said browsing function by the application program, reporting to the application program an array of capabilities that are supported by said external data source/sink, said capabilities being available to be directly utilized by said application program.

13. The computer-implemented method of claim 12 further comprising reporting to said application program a plurality of entry points to a plurality of function calls that said application program may make to said selected external data source/sink, said plurality of function calls including a function call for returning the capability array for said data source/sink, said capability array identifying the capabilities of other of said plurality of function calls.

14. The computer-implemented method of claim 13 wherein said capability array comprises a plurality of masks, each of said masks associated with a different logical group of capabilities.

15. The computer-implemented method of claim 14 wherein said capability array comprises a summary mask, said summary mask including an entry corresponding to each of the other masks of said plurality of masks, each entry indicating whether any of the capabilities of the corresponding logical group of capabilities is present.

16. The computer-implemented method of claim 14 wherein at least one of said masks corresponds to data definition capabilities that are supported by said plurality of function calls.

17. A computer-implemented method for enabling an application program to connect to an external data source/sink, said application program supporting a first plurality of data types, said external data source/sink supporting a second plurality of data types, the method comprising:

establishing connectivity of said application program to said data source/sink through a driver;

once connectivity between said application program and said data source/sink is established, negotiating a mutually supported data type for transferring data between said application and said external data source/sink, said negotiating taking place between the application program and said driver; and adopting the mutually supported data type for transferring data between said application and said external data source/sink.

18. The computer-implemented method of claim 17 wherein the step of negotiating comprises reporting to said application program which of said second plurality of data types said external data source/sink proposes to use to transfer data to said application program, and wherein said adopting step comprises changing from said proposed data type to said mutually supported data type.

19. The computer-implemented method of claim 18 wherein said negotiating step further comprises reporting to the application program the data types included among said second plurality of data types.

20. The computer-implemented method of claim 19 wherein said changing step comprises selecting one of said second plurality of data types as said mutually supported data type.

* * * * *

UNITED STATES PATENT AND TRADEMARK OFFICE
CERTIFICATE OF CORRECTION

PATENT NO. : 5,475,836

DATED : December 12, 1995

INVENTOR(S) : Peter O. Harris, et al.

It is certified that error appears in the above-identified patent and that said Letters Patent is hereby corrected as shown below:

Cover Page, in the Abstract Section, line 5, replace "driver means" with --drivers--;

Col. 4, line 20; replace "While" with --while--;

Col. 6, lines 8-9, delete "mapped memory deallocator functions, respectively. Fields"

Col. 6, line 11, after "and" insert --mapped memory deallocator functions, respectively. Fields--

Signed and Sealed this

Seventeenth Day of December, 1996

Attest:

BRUCE LEHMAN

Attesting Officer

Commissioner of Patents and Trademarks